United States Patent
Chen

(10) Patent No.: US 6,202,050 B1
(45) Date of Patent: Mar. 13, 2001

(54) WITHOUT LOSING WORDS OF VOICE ACTIVATE TRANSMITTING DEVICE FOR TWO WAY RADIO

(75) Inventor: Stephen Chen, Chang-Hua (TW)

(73) Assignee: E. Lead Electronic Co., Ltd., Chang-Hua (TW)

(*) Notice: Subject to any disclaimer, the term of this patent is extended or adjusted under 35 U.S.C. 154(b) by 0 days.

(21) Appl. No.: 09/249,821

(22) Filed: Feb. 16, 1999

(51) Int. Cl.[7] .................................................. G10L 11/02
(52) U.S. Cl. ............................................. 704/275; 704/270
(58) Field of Search ............................. 704/275, 270, 704/231, 200, 201, 233, 246; 379/88.01

(56) References Cited

U.S. PATENT DOCUMENTS 5,657,380 * 8/1997 Mozer ................................ 379/88.01

* cited by examiner

Primary Examiner—Richemond Dorvil
(74) Attorney, Agent, or Firm—Rosenberg, Klein & Lee

(57) ABSTRACT

A voice actuated transmitting device adapted for use in a two-way radio (or walkie-talkie) which enables operation without any loss of voice message in transmission is provided. The two-way radio is equipped with a transmit/receive circuit, a microphone amplifying circuit, and a voice actuated transmitting device. The voice actuated transmitting device includes a voice memory module coupled to the transmit/receive circuit and the microphone amplifying circuit; a voice recognizing circuit coupled to the voice memory module; and, a transmitting control circuit coupled to the voice recognizing circuit. The voice memory module stores sound data signals in sequential manner, such that the stored data may be accessed by the transmitting control circuit in a first-in-first-out cyclic manner. The voice recognizing circuit detects the presence of voice data in the stored sound data signal in accordance with a set of predetermined parametric criteria. Transmission is automatically actuated responsive to this detection to occur only when voice data is actually present. The transmitting control circuit is operable to generate a blank header signal for transmission with the voice data so as to compensate for any inherent delays in reception of the transmitted voice data.

9 Claims, 12 Drawing Sheets

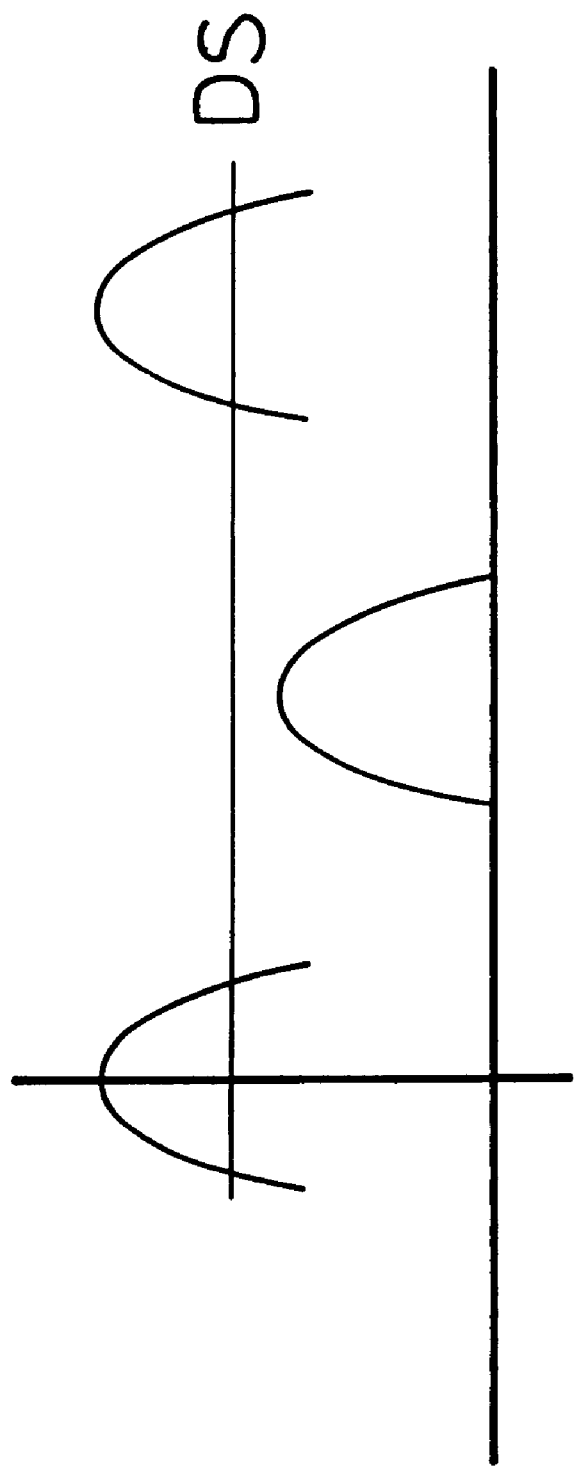
F I G. 5

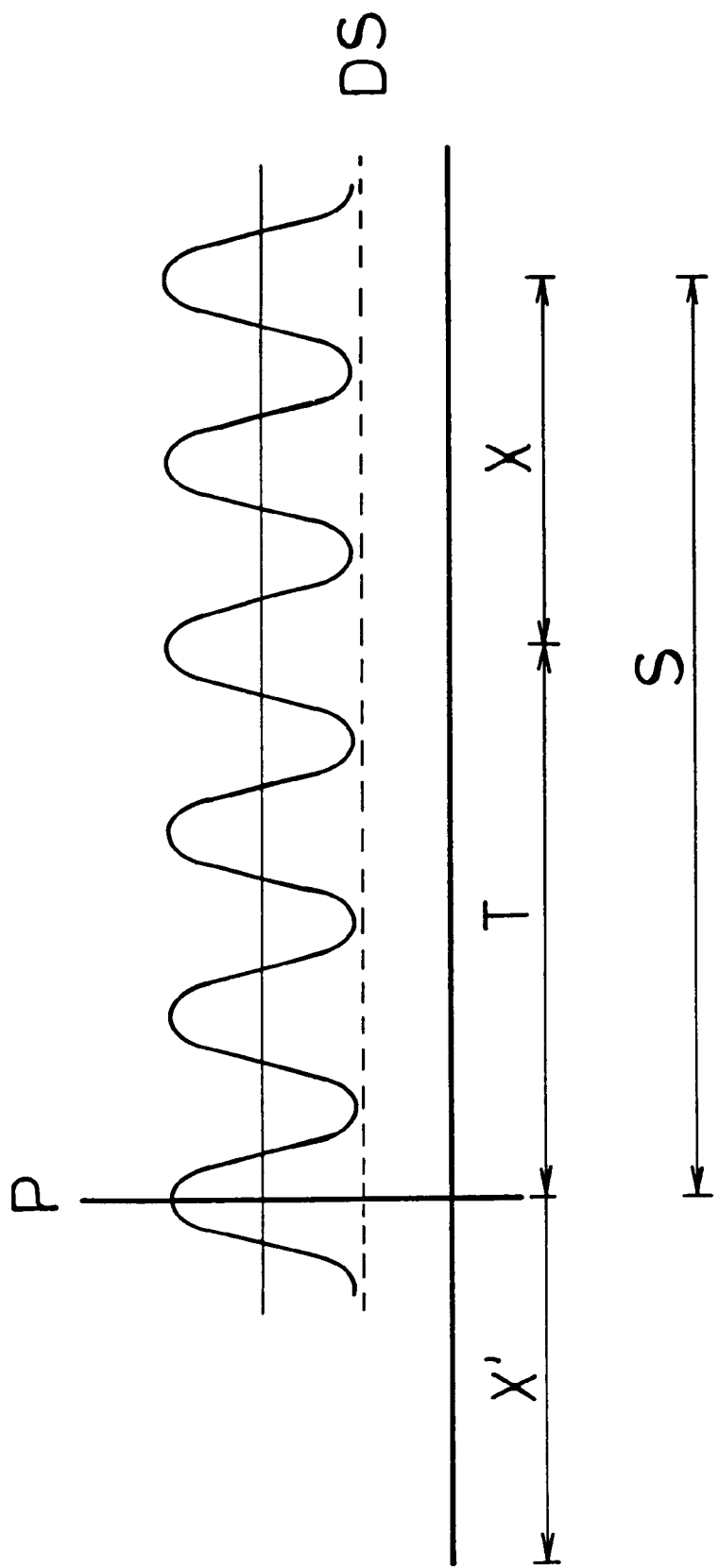
F I G. 6

WITHOUT LOSING WORDS OF VOICE ACTIVATE TRANSMITTING DEVICE FOR TWO WAY RADIO

BACKGROUND OF THE INVENTION

1. Field of the Invention

The present invention relates to a voice activate transmitting device for a two way radio (or walkie-talkie) without incurring a losing words effect.

2. Description of the Invention

A conventional two way radio (or walkie-talkie) according to the prior art is shown in FIG. 1, and comprises a transmitting/receiving circuit, and a microphone amplifying circuit. The transmitting/receiving circuit comprises a demodulation circuit 11, mixers 12 and 14, a bandpass filter circuit 13, a down converter circuit 15, a transmitting/receiving signal interchange circuit 16, a filter circuit 17, a common antenna 18, a quartz oscillation circuit 19, a modulation circuit 20, an up converter circuit 21, a noise filter circuit 22, a lowpass filter circuit 23, an audio filter circuit 27, a microprocessor 28, a receiving circuit power supply control unit 29, a transmitting circuit power supply control unit 30, an identification code generating circuit 31, a loudspeaker control circuit 32, an amplifier 34, and a loudspeaker 33, etc. The microphone amplifying circuit comprises a microphone control circuit 24, an amplifier 25, and a microphone 26.

By such an arrangement, when the user is intended to use the two way radio, he/she has to press a push button such that the transmitting circuit of the two way radio can transmit a voice signal. However, the related circuits will reach a steady working state during a period of time due to the capacity effect or others thereof, hereby causing a "transmitting delay" such that when the user talks to the two way radio before the related circuits reach the steady working state, part of the voice message cannot be received or will be lost by the receiving circuit of another two way radio of the other party, thereby making the voice message not perfect such that the other party easily misunderstands what the user means. In addition, the transmitting circuit and the receiving circuit of the two way radio both communicate with the outside through the same channel such that the transmitting circuit and the receiving circuit cannot be operated simultaneously. Therefore, when two opposite parties transmit voices simultaneously, the two opposite parties cannot actually receive the voice signals. Moreover, the user has to press the push button when he/she is intended to use the two way radio, thereby causing inconvenience to the user. The present invention has arisen to overcome the disadvantages of the conventional two way radio.

SUMMARY OF THE INVENTION

The primary objective of the invention is to provide a voice activate transmitting device for a two way radio. The two way radio includes a transmitting/receiving circuit, microphone, microphone amplifier, speaker and audio amplifier. The voice activate device comprises: a voice memory modual circuit which output connected to the transmitting/receiving circuit, and input connected to the microphone amplifier. A voice recognizer connected to the memory modual and the so called transmitting control circuit.

The voice memory modual can be an analog voice memory or a digital memory with a pair of A/D, D/A converters and is a first-in-first-out (F.I.F.O.) memory.

The transmitting control circuit is to access the memory address and to check whether the memory is full, if true then the next data is put at from the beginning of the memory and cover the original data to make the memory work as a "circular memory". The voice recognizing circuit contains a plurality of pre-set variable values therein which are compared with the sound data input into the memory and to decide if the data is "possible be" the head of a voice to transmit. If true, put a pointer on it (or write down the address) and keep making sure whether it is the "actual voice data" to transmit and make a decision to transmit all of the voice data from the pointer. Or even put a string of blank signal before the pointer.

The transmitting control circuit is to access the transmitting circuit following the command of the voice recognizing circuit.

The two way radio preferably includes one microphone and amplifier, or alternatively includes two microphones and amplifiers. The two way radio further includes a voice activate hand-free set, and the voice activate hand-free set comprises a voice memory modual, a voice recognizing circuit, a transmitting control circuit, and an attachment which are all assembled into an unit so as to be used to the voice activate hand-free set of the two way radio. The attachment preferably includes at least a microphone, and a speaker.

Further objectives and advantages of the present invention will become apparent after a careful reading of the detailed description with reference to the accompanying drawings.

BRIEF DESCRIPTION OF THE DRAWINGS

FIG. 5 is a schematic view of ambient voices;

FIG. 6 is a schematic view of a normal input voice wave;

DETAILED DESCRIPTION OF THE PREFERRED EMBODIMENTS

Figure 1A:
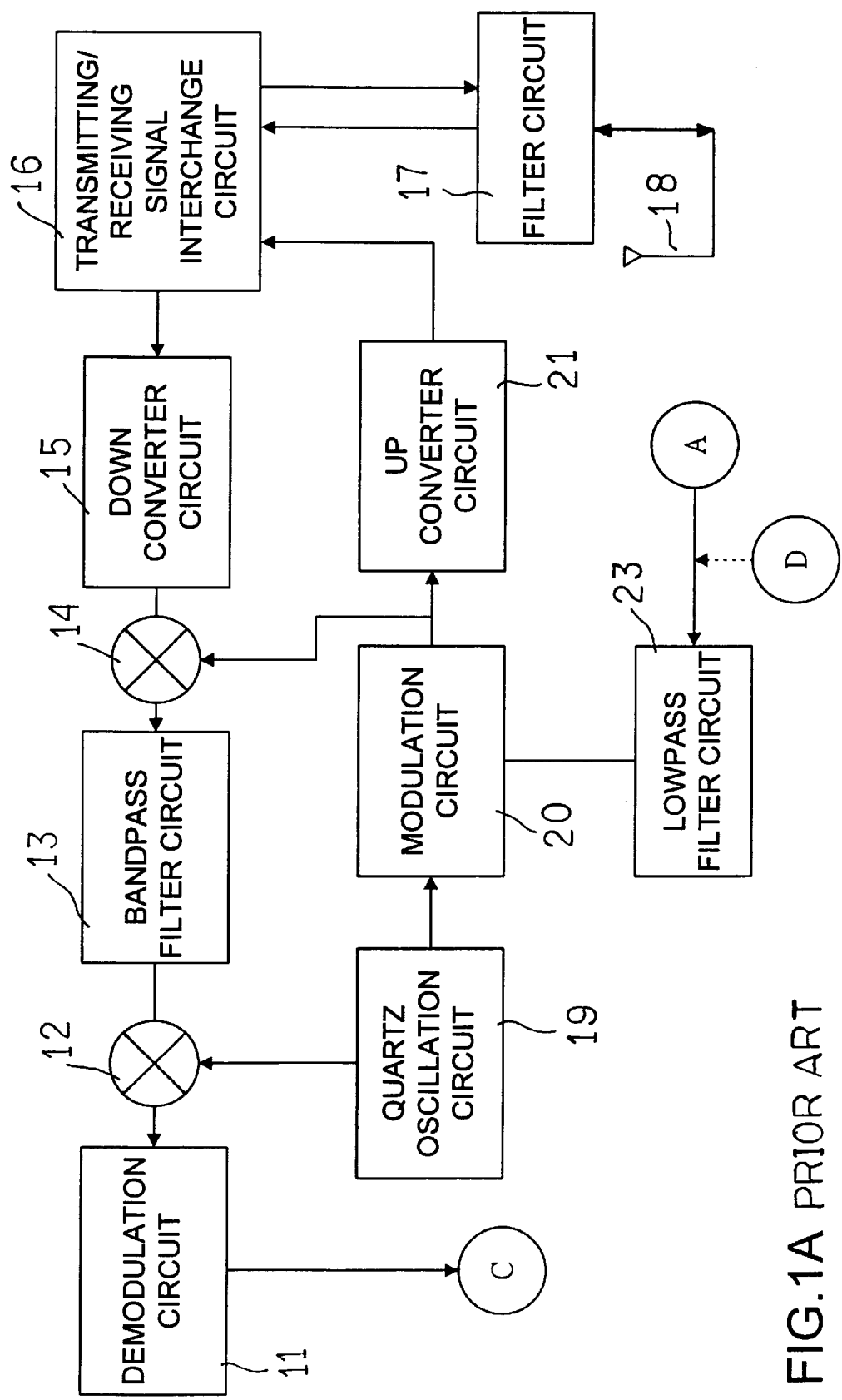
FIG. 1 is a circuit chart of a two way radio according to the prior art.
Figure 1B:
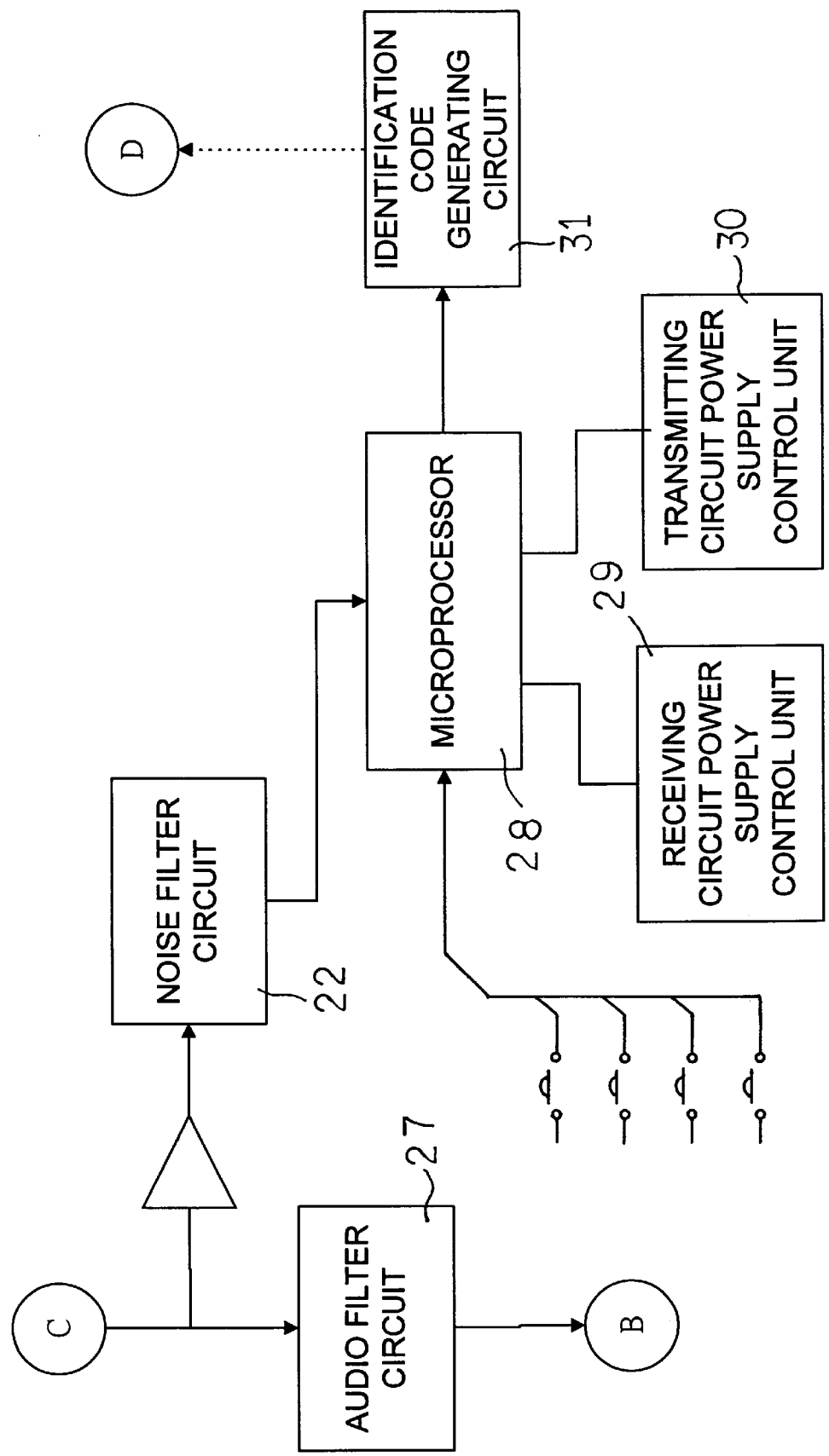
Figure 1C:
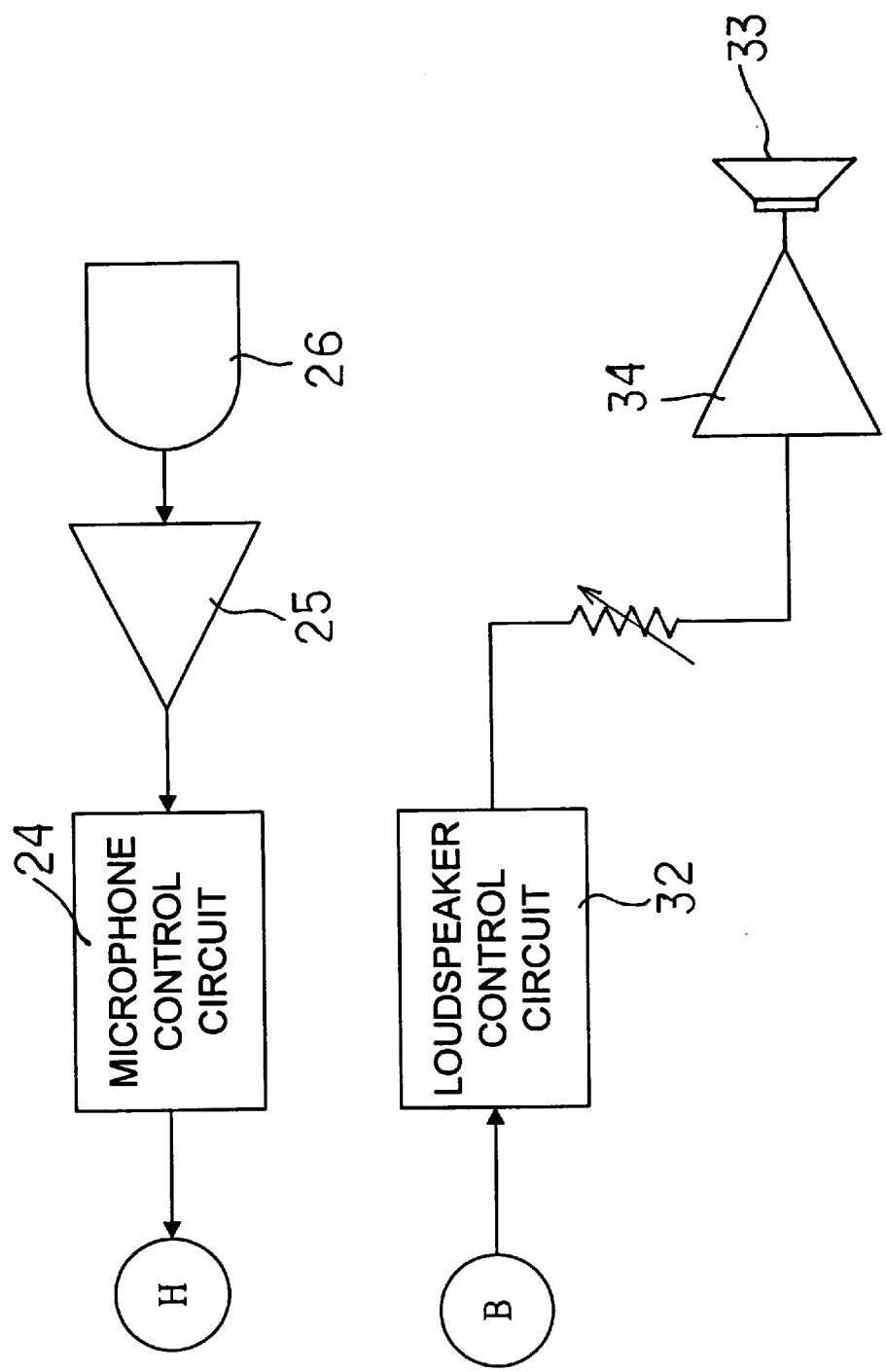
Figure 2A:
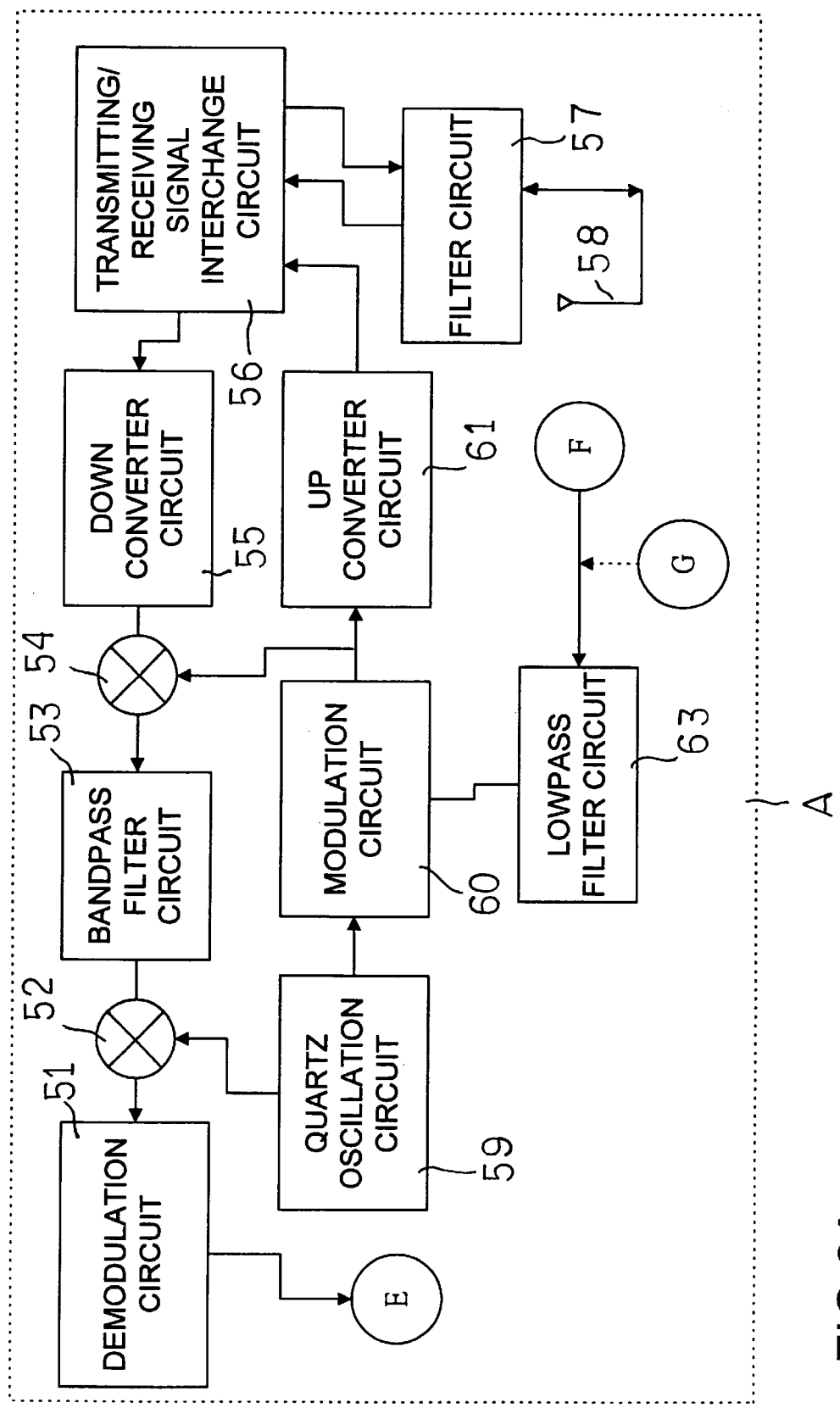
FIG. 2 is a circuit chart of a two way radio according to the present invention.
Figure 2B:
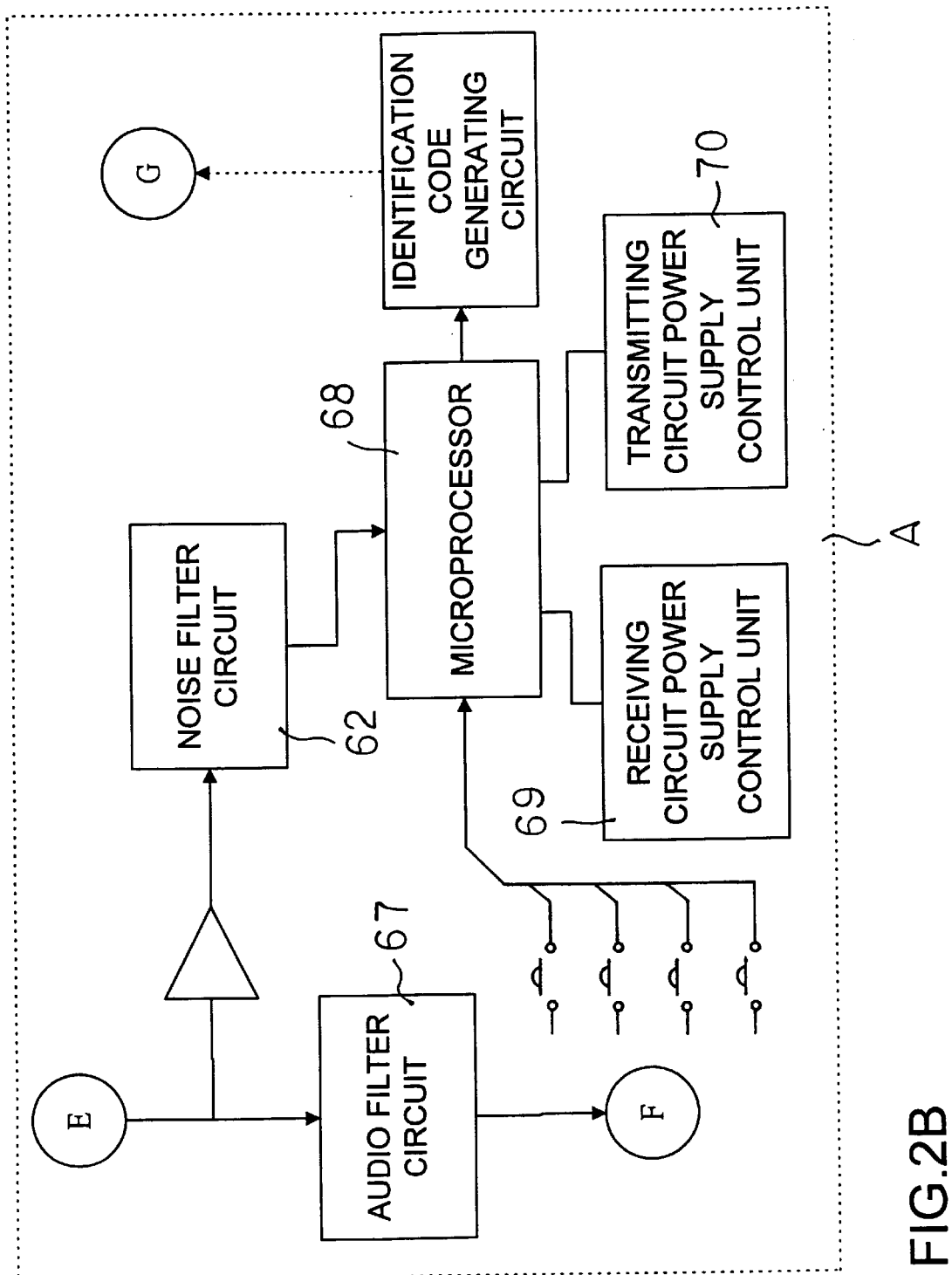
Figure 2C:
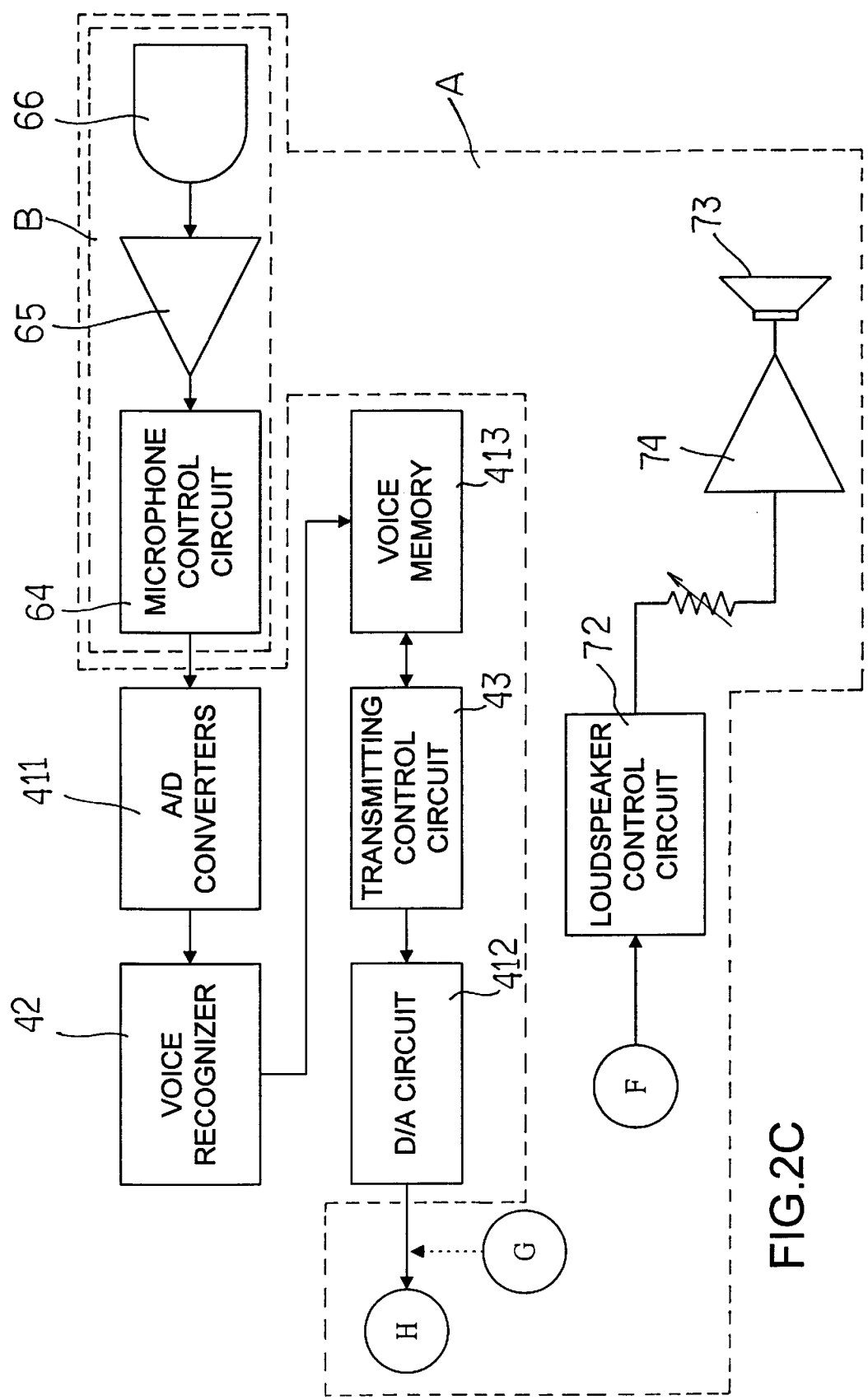
Figure 3:
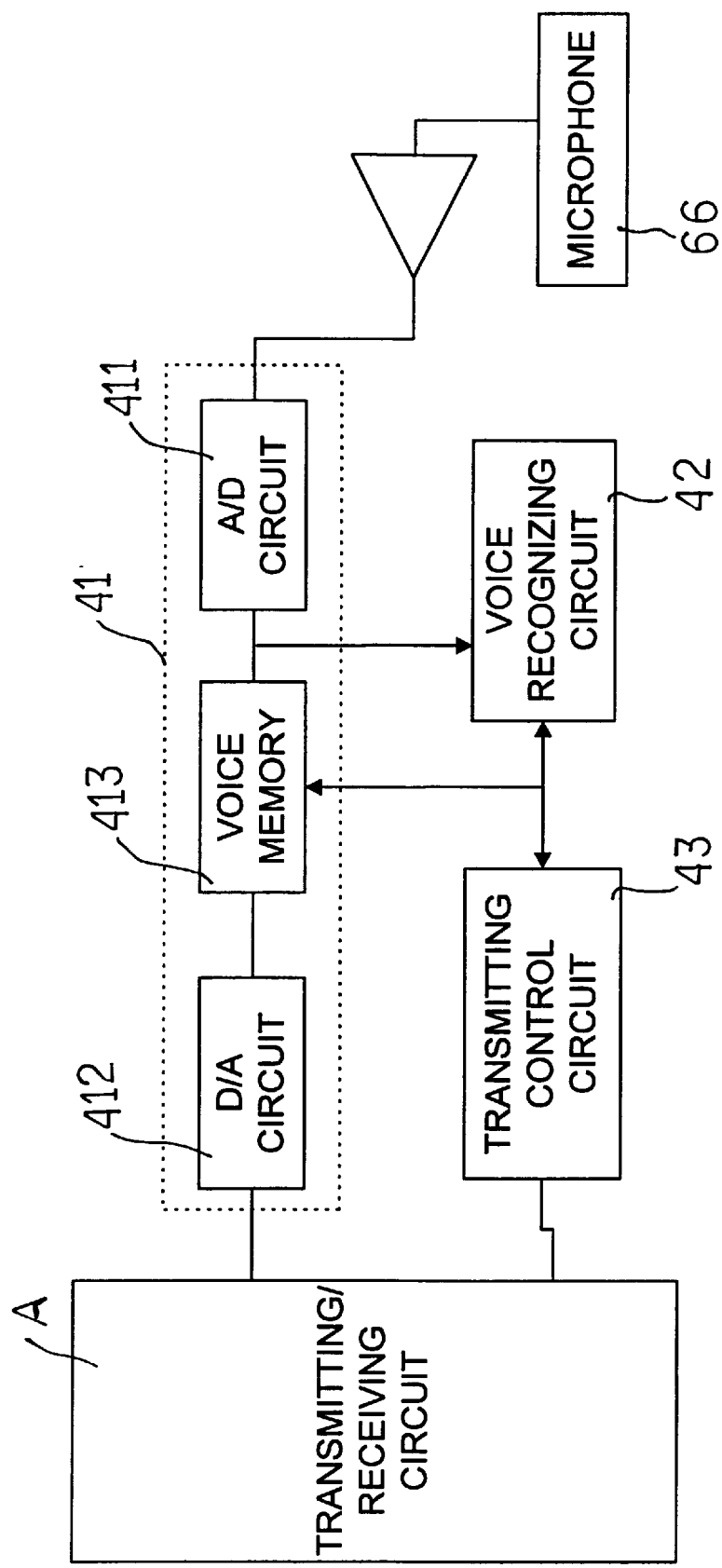
FIG. 3 is a circuit chart of a voice activating transmitting device for the two way radio according to the present invention.

Now, with reference to FIGS. 2 and 3, a two way radio (or walkie-talkie) according to the present invention comprises a transmitting/receiving circuit A, a microphone amplifying circuit B, and a voice activating transmitting device.

The transmitting/receiving circuit A comprises a demodulation circuit 51, mixers 52 and 54, bandpass filter circuit 53, a down converter circuit 55, a transmitting/receiving signal interchange circuit 56, filter circuits 57, a common antenna 58, a quartz oscillation circuit 59, a modulation circuit 60, an up converter circuit 61, a noise filter circuit 62, a lowpass filter circuit 63, an audio filter circuit 67, a microprocessor 68, a receiving circuit power supply control unit 69, a transmitting circuit power supply control unit 70, an identification code generating circuit 71, a loudspeaker control circuit 72, an amplifier 74, and a loudspeaker 73, etc.

The microphone amplifying circuit B comprises a microphone control circuit 64, an amplifier 65, and a microphone 66.

The voice activate device according to the present invention comprises: a voice memory modual circuit 41 which output connected to the transmitting/receiving circuit A, and input connected to the microphone amplifier 64. A voice recognizer 42 connected to the memory modual 41 and the so called transmitting control circuit 43.

The voice memory modual 41 can be an analog voice memory or a digital memory with a pair of A/D converters 411, D/A converters 412.

Figure 4:
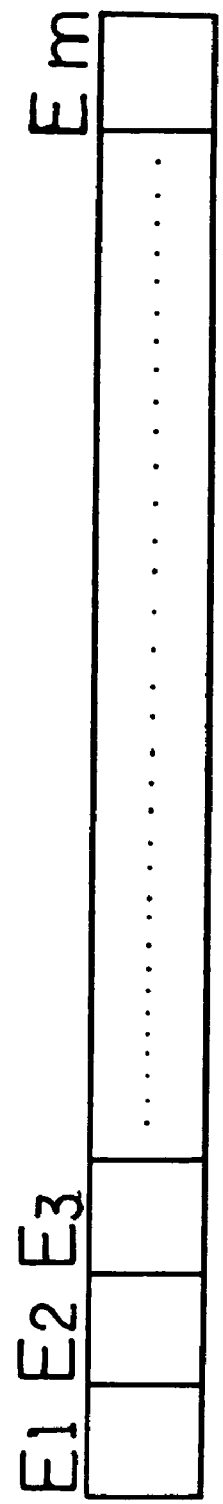
FIG. 4 is a schematic view of a voice registering circuit of the voice activating transmitting device as shown in FIG. 3.

Especially referring to FIG. 4, the address of voice memory modual 41 is accessed by the transmitting control circuit to be a first-in-first-out (F.I.F.O.) and circular memory structure. The voice data input from the microphone is written from the beginning of the memory with the address sequence $E_1, E_2, E_3, \ldots, E_m$, to the end of the memory ($E_m$), then the next data will be written at the beginning of the memory with the address sequence $\ldots, E_{m-2}, E_{m-1}, E_m, E_1, E_2, \ldots$ to replace the old data thereon such that the voice memory modual 41 is able to store the newest voice data continuously.

It is necessary to need a term of time to make sure the "actual voice data". The voice recognizer 42 contains a plurality of pre-set variable values therein which are compared with the voice data input into the voice memory modual 41 so as to identify if the sound data is "possible be voice" and put a pointer at its address, and therefor making more comparison to make sure whether it is "actual voice data" to decide to activate the transmitting circuit B or abandon the marker if it is not "actual voice data".

In practice, with reference to FIGS. 2–6, when the two way radio is used, the microphone 66 will receive ambient sounds continuously which are converted by the A/D circuit 411, then pass to voice recognizer and are serially stored in the voice memory set 413 temporarily.

The ambient voices usually are intermittent voice waves as shown in FIG. 5, which are possibly identified by the voice recognizing circuit 42 to reach the requirement of the "possible be voice" during a short period of time. However, the lasting time of the voice data is not long enough to satisfy the predetermined start value DS preset in the voice recognizing circuit 42 such that the voice data stored in the voice memory modual 41 will be overlapped by latter new voice data during a period of time and never to be sent.

On the contrary, when the input voice data from the microphone 66 are identified by the voice recognizing circuit 42 to reach the start value DS (the start value DS is directly set by the manufacturer) of the "possible be voice" preset in the voice recognizing circuit 42 during a long period of time as shown in FIG. 6, the first signal P of the sound data will be recorded on the voice memory modual 41. When the sound data reach the requirement of the "actual voice data" during a period of time T, the transmitting control circuit 43 will activate the transmitting/receiving circuit A. It requires a period of working time X from the starting of the transmitting/receiving circuit A to the stable operating state of the transmitting/receiving circuit A, and the total value of the required period of time T and the working time X is equal to the transmitting delay time S, i.e., $S=T+X$.

When the transmitting control circuit 43 reads the voice data from the voice memory modual 41 to transmit depending on the first signal P of the voice data, the transmitting control circuit 43 will add a leading blank string with length X before the first signal P so as to prevent existence of the transmitting delay. The voice data with blank string are then converted by the D/A circuit 412, and the signal of the blank data string voice data are then transmitted by the transmitting/receiving circuit A. When the input voice data are identified by the voice recognizing circuit 42 to be lower than the condition of the "continuous transmitting voices", the last address of the voice data recorded on the voice memory 413 is identified by the voice recognizing circuit 42. When the transmitting control circuit 43 reads the last address of the voice data from the voice memory 413, the voice transmission by the transmitting/receiving circuit A is ended, and the related records are returned to their normal state.

In such a manner, when an operator uses the two way radio, he/she just requires to talk to the microphone 66, the voice transmitting device according to the present invention will automatically determine the starting and the ending of the voice transmission from the operator, and will then send the voice message to the ambient environment such that the operator needs not to press any push button. In addition, the voice data can be continuously and repeatedly recorded on the voice memory 413 such that the losing words phenomenon due to the transmitting delay of the related circuits will not occur.

Accordingly, the voice activating transmitting device according to the present invention can be provided for the two way radio (or walkie-talkie) without incurring a losing words effect.

Figure 7:
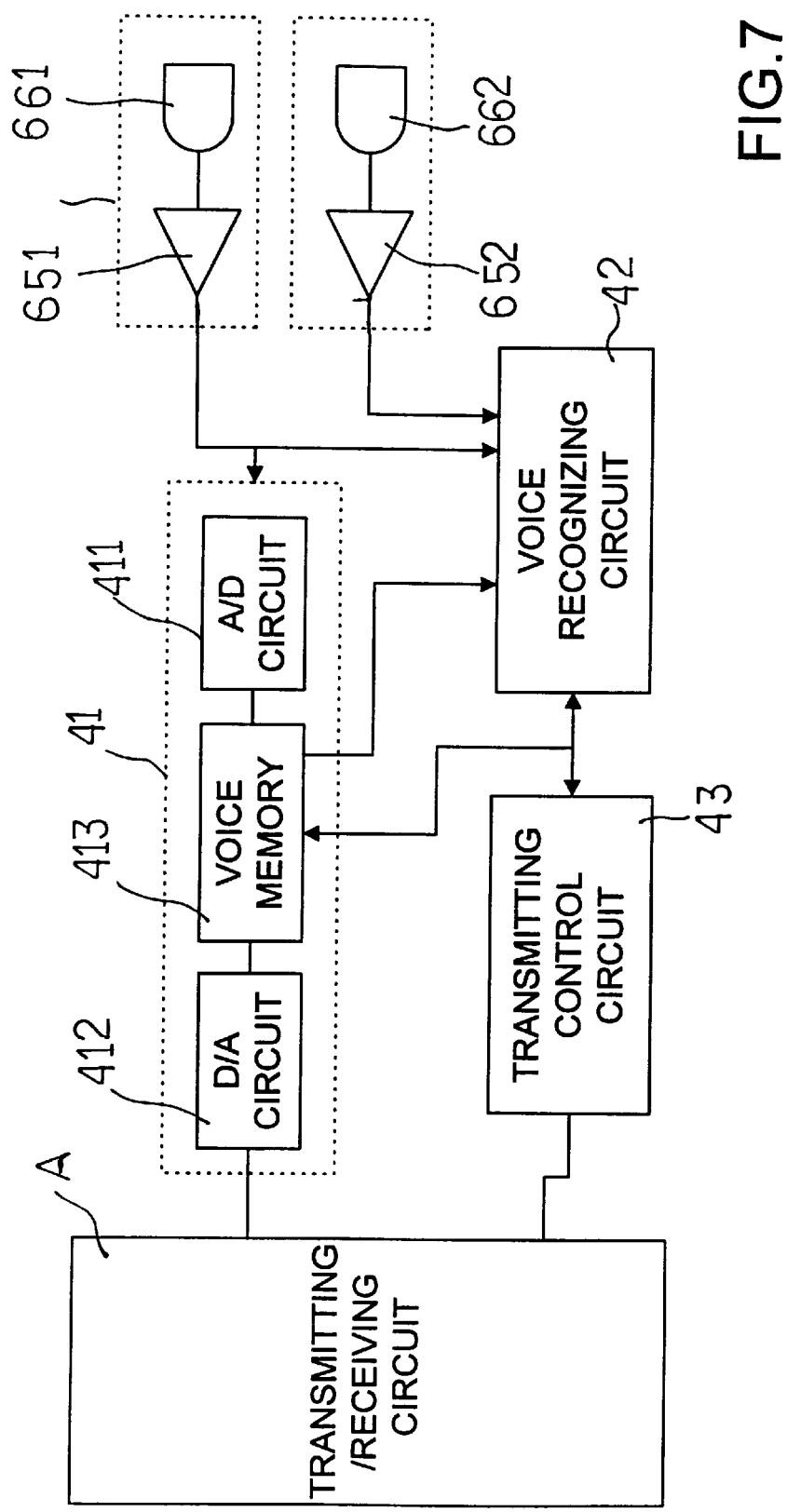
FIG. 7 is a circuit chart of an voice activating transmitting device for the two way radio according to another embodiment of the present invention.

With reference to FIG. 7, according to another embodiment of the present invention, the two way radio includes two microphone amplifying circuits C and D, wherein the first microphone amplifying circuit C comprises an amplifier 651, and a microphone 661, and the second microphone amplifying circuit D comprises an amplifier 652, and a microphone 662. The microphone 661 of the first microphone amplifying circuit C is much nearer to the mouth of the operator than the microphone 662 of the second microphone amplifying circuit D such that the operator's voice signal of the first microphone amplifying circuit C is much greater than that of the second microphone amplifying circuit D, so as to enhance the identifying effect of the voice recognizing circuit 42 of the voice activating device.

On the other hand, the transmitting circuit and the receiving circuit of the two way radio both communicate with the outside through the same channel such that when two parties transmit voices simultaneously, each of the two parties cannot actually receive the voice signals. Consequently, the transmitting control circuit 43 is able to detect the receiving circuit such that when a signal enters, the transmitting circuit will suspend its action or make a signal to ask the operator to send the voice message again after finishing receiving.

Figure 8:
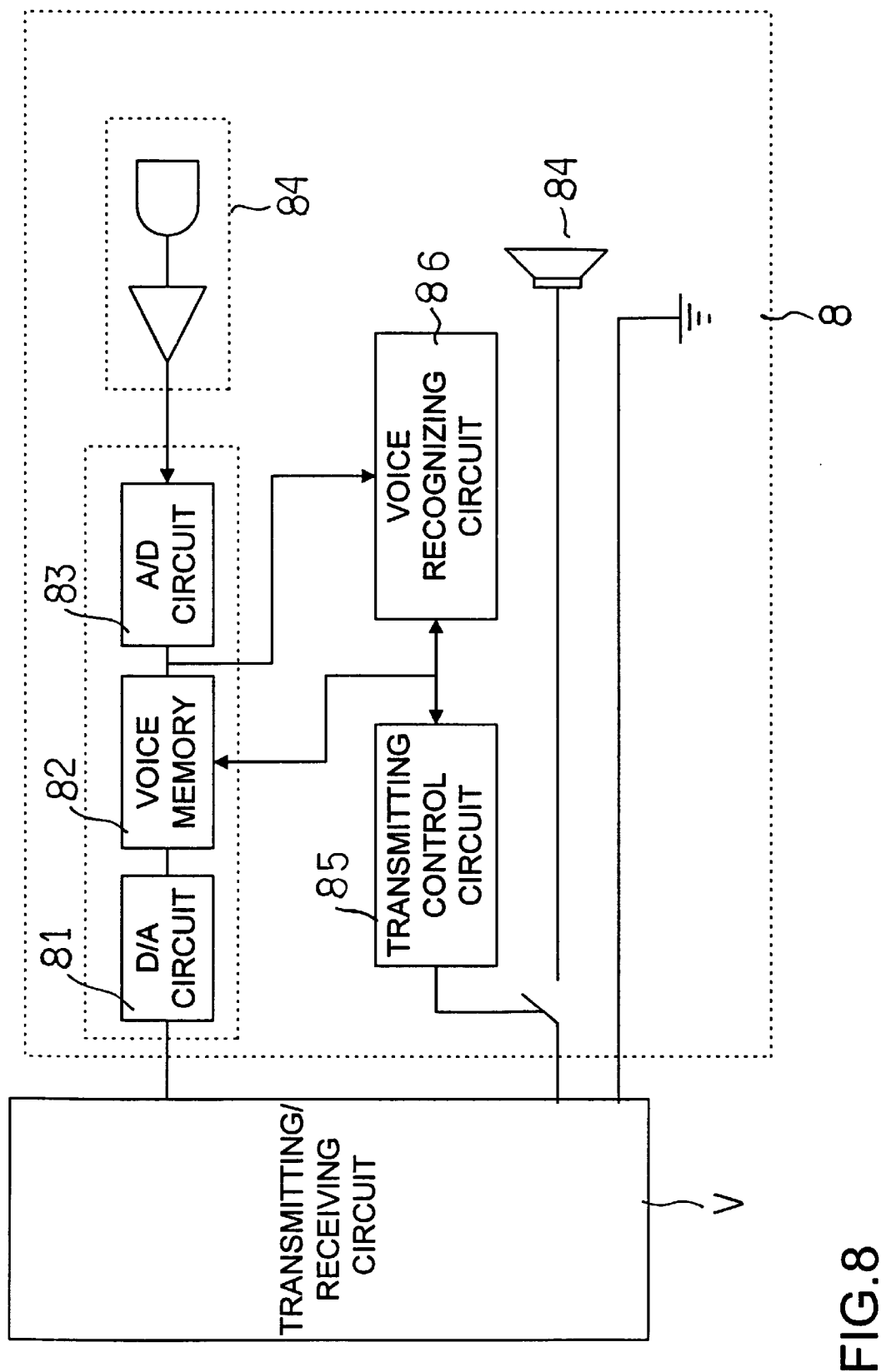
FIG. 8 is a circuit chart of an voice activating transmitting device in a hand-free set for two way radio according to a further embodiment of the present invention.

With reference to FIG. 8, according to a further embodiment of the present invention, the voice transmitting device 8 further comprises the D/A circuit 81, the transmitting control circuit 85, a transmitting/receiving circuit control interface V, the voice memory 82, the A/D circuit 83, and an attachment including a microphone 84, an earphone (or a speaker) 87. The above-mentioned elements are all assembled into a unit so as to be used as a hand-free kit of the two way radio.

On the other hand, in the conventional two way radio, its receiving circuit is always disposed in a standby status, but its transmitting circuit is started only when the transmitting action is required. Consequently, the receiving circuit of the conventional two way radio is usually disposed in an intermittent turn on/turn off operation mode so as to save power. However, the intermittent time of the receiving circuit is always limited smaller than 0.2 second to prevent losing words such that the power saving effect is limited.

According the present invention, the transmitting voices are previously stored in the voice memory modual 41 temporarily, and the transmitting/receiving circuit A is started only when the transmitting requirements are satisfied. Therefore, under the efficient control of the transmitting circuit and the receiving circuit of the transmitting/receiving circuit A, the transmitting control circuit 43 is able to add a "blank signal string" before the actual voice message the transmitting circuit of the transmitting/receiving circuit A transmits a voice signal with the blank signal string. The "blank signal" is the intermittent time of the receiving circuit of the transmitting/receiving circuit A of the other party. When the intermittent time of the receiving circuit is set to one second, the transmitting control circuit 43 will add the "blank signal string" of one second of time before the actual voice message so as to awake the receiving circuit of the other party before the actual voice is sent. The transmitting control circuit 43 then in turn reads out the voice data from the voice memory 413 serially, and the voice signals are then transmitted by the transmitting circuit. Accordingly, when the intermittent time of the receiving circuit is equal to one second, the value is five times of that of the receiving circuit of the conventional two way radio (the intermittent time thereof is smaller than 0.2 second), thereby achieving the purpose of saving electricity.

Although the present invention has been described with a certain degree of particularity, it is to be understood that the present disclose has been made by way of example only and that many other possible modifications and variations can be made without departing from the scope and spirit of the present invention.

What is claimed is:

1. A voice actuated radio communication system comprising:
    (a) a transmit/receive circuit;
    (b) at least one microphone amplifying circuit coupled to said transmit/receive circuit for generating a sound data signal; and,
    (c) a voice actuated transmitting device coupled to said transmit/receive circuit, said voice actuated transmitting device including:
        (1) a voice memory module defining a plurality of memory addresses for storing in sequential manner at least a portion of said sound data signal,
        (2) a voice recognizing circuit coupled to said voice memory module for detecting in accordance with a predetermined set of parametric criteria the presence of voice data within said portion of sound data signal stored in said voice memory; and,
        (3) a transmitting control circuit coupled to said voice recognizing circuit and said voice memory module, said transmitting control circuit automatically actuating transmission of said voice data by said transmit/receive circuit responsive to said voice data presence detection of said voice recognizing circuit.

2. The voice actuated radio communication system as recited in claim 1 wherein said voice memory module is configured to store at least a portion of said sound data signal in a first-in-first-out cyclic manner.

3. The voice actuated radio communication system as recited in claim 1 wherein said transmitting control circuit is coupled to said voice memory module in read and write accessible manner.

4. The voice actuated radio communication system as recited in claim 1 wherein said voice memory module includes an analog-to-digital converter and a digital-to-analog converter.

5. The voice actuated radio communication system as recited in claim 1 comprising a pair of microphone amplifying circuits, said voice recognizing circuit comparatively processing said sound data signals generated respectively thereby in said detection of voice data presence.

6. The voice actuated radio communication system as recited in claim 1 wherein said transmitting control circuit generates a blank header signal for transmission with said voice data, whereby loss of said transmitted voice data due to switching delay during reception thereof is avoided.

7. The voice actuated radio communication system as recited in claim 1 further comprising an earphone coupled to said transmit/receive circuit.

8. The voice actuated radio communication system as recited in claim 1 further comprising a speaker coupled to said transmit/receive circuit.

9. The voice actuated radio communication system as recited in claim 1 wherein said predetermined parametric criteria of said voice recognizing circuit include a preset amplitude threshold value and a preset time duration value, said detection of voice data presence being triggered upon at least a portion of said sound data signal exceeding said preset amplitude threshold value continuously for at least said preset time duration.

\* \* \* \* \*

UNITED STATES PATENT AND TRADEMARK OFFICE
CERTIFICATE OF CORRECTION

PATENT NO. : 6,202,050 B1  
DATED : March 13, 2001  
INVENTOR(S) : Stephen Chen

Page 1 of 1

It is certified that error appears in the above-identified patent and that said Letters Patent is hereby corrected as shown below:

<u>Title page,</u>
Item [54], please delete the Title "WITHOUT LOSING WORDS OF VOICE ACTIVATE TRANSMITTING DEVICE FOR TWO WAY RADIO" and insert therefor the Title -- VOICE ACTUATED TRANSMITTING DEVICE FOR A TWO-WAY RADIO SYSTEM OPERABLE WITHOUT LOSS OF VOICE MESSAGE DURING TRANSMISSION --

Signed and Sealed this

Twentieth Day of November, 2001

*Attest:*

*Nicholas P. Godici*

*Attesting Officer*

NICHOLAS P. GODICI  
*Acting Director of the United States Patent and Trademark Office*